United States Patent Office 2,752,281
Patented June 26, 1956

2,752,281

IODINE DISSOLVED IN AQUEOUS SOLUTIONS OF MALEIC ANHYDRIDE-VINYL ETHER COPOLYMERS

Warren D. Niederhauser, Huntingdon Valley, Pa., assignor to Rohm & Haas Company, Philadelphia, Pa., a corporation of Delaware No Drawing. Application June 1, 1953,
Serial No. 358,975

5 Claims. (Cl. 167—17)

This invention deals with compositions comprising iodine dissolved in an aqueous solution of a copolymer of maleic anhydride and a vinyl ether of the structure $$CH_2=CH-O-R$$

where R is methyl, ethyl, methoxyethyl, or ethoxyethyl. These compositions are potent antiseptic, disinfecting, and sanitizing agents.

The germicidal action of iodine was discovered many years ago. Since then, much time and thought have been directed to providing suitable media for utilizing iodine and at the same time decreasing the objectionable properties of this element without an optimum solution being reached of the problems associated with its use.

It has now been found that compositions with advantageous properties result when elemental iodine is taken up by aqueous solutions of copolymers of maleic anhydride and vinyl ethers having as O-substituents methyl or ethyl groups. The compositions contain iodine in a complex form in which it is highly effective as a bacteriostatic and bactericidal agent. These compositions are thus useful even in the presence of organic contaminants or of the inorganic salts found in hard waters. At the same time, the compositions have low mammalian toxicity and advantages in odor, staining and irritation.

The aqueous solution of copolymer may contain from about 5% to saturation of a said copolymer. Iodine is added thereto in an amount of 1% to saturation based on the weight of the copolymer in solution. A practical upper limit is at about 10% of the weight of copolymer.

To prepare the compositions of this invention, iodine is mixed with a solution of a copolymer of maleic anhydride and a defined vinyl ether. The mixture is agitated until a required amount of iodine has been taken up. At temperatures of 20° to 40° C., which are suitable and generally used, iodine is taken up in one to twenty-four hours. Excess iodine or unreacted iodine may be filtered off.

Useful concentrations of copolymer depend in part upon the particular vinyl ether selected and the degree of polymerization of ether and maleic anhydride. Copolymers may be formed over a considerable range of molecular weights, number average molecular weights being encountered with these copolymers from about 2,000 to 150,000. The range of molecular sizes preferred for preparing the iodine complexes of this invention may conveniently be expressed in terms of viscosity of solutions. For example, preferred copolymers in aqueous 2% solutions give viscosities from about 1.5 to 12 centistokes at 25° C.

Some typical preparations of iodine complexes are presented in the following illustrative examples, parts being by weight.

Example 1

There are mixed 200 parts of an aqueous 10% solution of the copolymer of methyl vinyl ether and maleic anhydride and 0.92 part of iodine. The mixture is stirred for 24 hours at about 30° C. A known solution results. The copolymer here used gives a viscosity of 10 cs. at 25° C. in 2% solution.

When this solution is examined for its germicidal capacity by the Cantor-Shelanski method with the iodine diluted to 200 p. p. m., with *Salmonella typhosa* as the test organism, and with 1% whole milk as the contaminants, there is no survival of the organism at 15 or 30 seconds even after 10 increments. In comparison tests, it is observed that survival of test organism is found after the fifth increment where iodine is dissolved in an octyl-phenoxypolyethoxyethanol and used as a standard.

Example 2

There are taken 100 parts of an aqueous 20% solution of a copolymer of maleic anhydride and methyl vinyl ether, this copolymer having a molecular size such that a 2% aqueous solution thereof has a viscosity of 1.9 cs. at 25° C. This is mixed at room temperature with 1.5 parts of iodine until a brown solution results.

When this composition is evaluated by the Cantor-Shelanski method, it permits no survival after 10 increments with the solution diluted to 200 p. p. m. of iodine. There is no survival after 30 seconds when the total inoculum is added at once.

Example 3

There are mixed 3.5 parts of iodine and 100 parts of an aqueous 25% solution of the copolymer from equimolar proportions of maleic anhydride and methoxyethyl vinyl ether. The mixture is agitated at 30°–35° C. for 20 hours to give a brown solution.

By the Cantor-Shelanski method the germicidal capacity of the composition diluted to 200 p. p. m. of iodine permits addition of at least 10 increments, there being no survival after 15 or 30 seconds. There is no survival at 30 seconds when the entire inoculum is added at once.

Example 4

The process of Example 3 is repeated with 3.5 parts of iodine and 100 parts of aqueous 25% solution of the copolymer of maleic anhydride and ethoxyethyl vinyl ether. The composition resulting is likewise effective in permitting no survival of test organism for at least 10 increments and permitting no survival 30 seconds after the entire inoculum is added at once, the tests being conducted with iodine diluted to 200 p. p. m.

Adequate sanitizing properties are found for the compositions of this invention as long as color is noted in the use solutions. These iodophors, therefore, provide their own indicator action.

These compositions are effective in the presence of organic contaminants, in hard water, and in cold water. They may be used as premise disinfectants, as sanitizers for glassware and crockery, and for other purposes. They are low in odor and in staining propensities. They are stable, retaining their effectiveness indefinitely.

I claim:

1. As a new composition, an aqueous solution containing iodine and a water-soluble copolymer of maleic anhydride and a vinyl ether having the formula $$CH_2=CH-O-R$$

wherein R is a member of the class consisting of the methyl, ethyl, methoxyethyl, and ethoxyethyl groups, said copolymer being present in an amount from 5% by weight to saturation of the solution, said copolymer imparting to an aqueous 2% solution thereof a viscosity at 25° C. from 1.5 to 12 centipoises, and said iodine being present in an amount from 1% to 10% of the weight of said copolymer.

2. As a new composition, an aqueous solution having dissolved therein iodine and a water-soluble copolymer of maleic anhydride and methyl vinyl ether, said copolymer being present in an amount from 5% by weight to saturation of the solution, said copolymer imparting to an aqueous 2% solution thereof a viscosity at 25° C. from 1.5 to 12 centipoises, and said iodine being present in an amount from 1% to 10% of the weight of said copolymer.

3. As a new composition, an aqueous solution having dissolved therein about 10% of a water-soluble copolymer of maleic anhydride and a vinyl ether having the formula $CH_2=CHOR$, wherein R is a member of the class consisting of the methyl, ethyl, methoxyethyl, and ethoxyethyl groups, and having iodine dissolved in said solution in an amount of 1% to 10% of the weight of said copolymer.

4. As a new composition, an aqueous solution having dissolved therein iodine and a water-soluble copolymer of maleic anhydride and methoxyethyl vinyl ether said copolymer being present in an amount from 5% by weight to saturation of the solution, said copolymer imparting to an aqueous 2% solution thereof a viscosity at 25° C. from 1.5 to 12 centipoises, and said iodine being present in an amount from 1% to 10% of the weight of said copolymer.

5. As a new composition, an aqueous solution having dissolved therein iodine and a water-soluble copolymer of maleic anhydride and ethoxyethyl vinyl ether said copolymer being present in an amount from 5% by weight to saturation of the solution, said copolymer imparting to an aqueous 2% solution thereof a viscosity at 25° C. from 1.5 to 12 centipoises, and said iodine being present in an amount from 1% to 10% of the weight of said copolymer.

References Cited in the file of this patent

UNITED STATES PATENTS 2,077,298    Zelger _____ Apr. 13, 1937

OTHER REFERENCES

West: Journal of Chemical Physics, 1947, page 689.

Middendorf: Medizin und Chemie, Verlag Chemie SMBH, 1942, pages 573–584.

Miller et al.: Journal of the Chemical Society, London, July 1951, page 1933.

Chem. and Engineering News, Feb. 19, 1951, page 664.

Chemical Week, Dec. 22, 1951, pages 19 and 20.